United States Patent
Yang et al.

(10) Patent No.: US 11,184,924 B2
(45) Date of Patent: Nov. 23, 2021

(54) MULTIPLE STARTING POSITIONS FOR UPLINK TRANSMISSION ON UNLICENSED SPECTRUM

(71) Applicant: Telefonaktiebolaget LM Ericsson (publ), Stockholm (SE)

(72) Inventors: Yu Yang, Solna (SE); Jung-Fu Cheng, Fremont, CA (US); Reem Karaki, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 5 days.

(21) Appl. No.: 16/608,950

(22) PCT Filed: Apr. 27, 2018

(86) PCT No.: PCT/IB2018/052949
§ 371 (c)(1),
(2) Date: Oct. 28, 2019

(87) PCT Pub. No.: WO2018/198092
PCT Pub. Date: Nov. 1, 2018

(65) Prior Publication Data
US 2020/0187249 A1    Jun. 11, 2020

Related U.S. Application Data

(60) Provisional application No. 62/491,399, filed on Apr. 28, 2017.

(51) Int. Cl.
*H04W 74/08* (2009.01)
*H04L 1/18* (2006.01)
(Continued)

(52) U.S. Cl.
CPC ....... *H04W 74/0808* (2013.01); *H04L 1/1812* (2013.01); *H04W 72/0446* (2013.01); *H04W 72/1268* (2013.01)

(58) Field of Classification Search
CPC ..... H04W 76/28; H04W 24/02; H04W 40/28; H04W 52/40; H04W 16/14; H04W 72/14;
(Continued)

(56) References Cited

U.S. PATENT DOCUMENTS 7,091,830 B2 *   8/2006   Anderson ............... G01N 22/04
                                                         137/78.3
7,920,544 B2 *   4/2011   Soliman ............... H04B 7/2687
                                                         370/350
(Continued)

FOREIGN PATENT DOCUMENTS

EP        3131223 A1    2/2017
EP        3131225 A1    2/2017
(Continued)

OTHER PUBLICATIONS

Latency and Reliability Analysis of Cellular Networks in Unlicensed Spectrum by Roberto Maldonado, et al, in IEEE Access, Mar. 2020. (Year: 2020).*

(Continued)

*Primary Examiner* — William D Cumming
(74) *Attorney, Agent, or Firm* — Withrow & Terranova, PLLC

(57) ABSTRACT

Systems and method for multiple uplink starting positions are disclosed. In some embodiments, a method of operating a wireless communication device includes identifying candidate starting positions for an uplink (UL) transmission in an unlicensed spectrum and selecting at least one starting position from among the candidate start positions based on autonomous UL starting points according to an outcome of a listen-before-talk (LBT) procedure performed with respect to the unlicensed spectrum and/or one or more fixed UL starting points signaled in a UL grant. In this way, a wireless (Continued)

communication device may improve throughput by using resources that would not have been available otherwise.

22 Claims, 13 Drawing Sheets

(51) Int. Cl.
  *H04W 72/04* (2009.01)
  *H04W 72/12* (2009.01)
(58) Field of Classification Search
  CPC ......... H04W 72/0453; H04W 72/0808; H04W 72/0446
  USPC .................................................. 370/350, 329
  See application file for complete search history.

(56) References Cited

U.S. PATENT DOCUMENTS

| | | | |
|---|---|---|---|
| 10,349,401 B2* | 7/2019 | Cheng | H04W 72/0446 |
| 10,630,518 B2* | 4/2020 | Park | H04B 7/0604 |
| 10,742,562 B2* | 8/2020 | Si | H04W 72/14 |
| 10,805,953 B2* | 10/2020 | Babaei | H04W 74/0808 |
| 2004/0086053 A1* | 5/2004 | Anderson | G01N 22/04 375/257 |
| 2012/0014349 A1 | 1/2012 | Chung et al. | |
| 2012/0213196 A1 | 8/2012 | Chung et al. | |
| 2016/0135185 A1 | 5/2016 | Chandrasekhar et al. | |
| 2016/0278048 A1 | 9/2016 | Nory et al. | |
| 2016/0345345 A1 | 11/2016 | Malik et al. | |
| 2016/0360525 A1* | 12/2016 | Cheng | H04L 27/0006 |
| 2017/0019909 A1* | 1/2017 | Si | H04W 16/14 |
| 2017/0041805 A1 | 2/2017 | Chandrasekhar et al. | |
| 2017/0231006 A1 | 8/2017 | Yin et al. | |
| 2017/0290008 A1 | 10/2017 | Tooher et al. | |
| 2019/0007972 A1* | 1/2019 | Gou | H04W 16/14 |
| 2019/0150184 A1* | 5/2019 | Golitschek Edler von Elbwart | H04L 1/1887 370/329 |
| 2019/0289635 A1 | 9/2019 | Wang et al. | |
| 2019/0379487 A1* | 12/2019 | Hwang | H04L 1/00 |
| 2019/0387543 A1 | 12/2019 | Karaki et al. | |
| 2020/0053782 A1* | 2/2020 | Zhang | H04L 5/0091 |
| 2020/0067651 A1* | 2/2020 | Takeda | H04L 1/0003 |
| 2020/0100286 A1* | 3/2020 | Xu | H04L 1/1887 |
| 2020/0127798 A1 | 4/2020 | Yang et al. | |
| 2020/0187249 A1* | 6/2020 | Yang | H04L 27/0006 |
| 2020/0205090 A1* | 6/2020 | Loehr | H04W 52/40 |
| 2020/0235898 A1* | 7/2020 | Loehr | H04W 16/14 |
| 2020/0266922 A1* | 8/2020 | Zhang | H04L 5/0042 |
| 2020/0322990 A1* | 10/2020 | Liu | H04L 5/0094 |
| 2020/0337083 A1* | 10/2020 | Loehr | H04W 72/14 |
| 2020/0344819 A1* | 10/2020 | Myung | H04W 74/0808 |
| 2020/0404708 A1* | 12/2020 | Zhang | H04W 74/0833 |
| 2021/0067308 A1* | 3/2021 | Ly | H04L 5/0064 |
| 2021/0160919 A1* | 5/2021 | Wang | H04W 74/08 |

FOREIGN PATENT DOCUMENTS

| | | |
|---|---|---|
| RU | 2479138 C2 | 4/2013 |
| WO | 2016074250 A1 | 5/2016 |
| WO | 2016146210 A1 | 9/2016 |
| WO | 2016148634 A2 | 9/2016 |
| WO | 2017049560 A1 | 3/2017 |
| WO | 2017207043 A1 | 12/2017 |
| WO | WO 2018/059412 * | 4/2018 |
| WO | 2018173004 A1 | 9/2018 |
| WO | 2018173005 A1 | 9/2018 |
| WO | WO2018173005 A1 * | 9/2018 |

OTHER PUBLICATIONS

Uplink Ultra-Reliable Low Latency Communications Assessment in Unlicensed Spectrum by Roberto Maldonado Cuevas; Claudio Rosa; Frank Frederiksen; Klaus I. Pedersen Published in: 2018 IEEE Globecom Workshops (GC Wkshps) Feb. 2019 (Year: 2019).*
Ericsson, "A solution for RLF in CP NB-IoT", 3GPP TSG-SA WG2 Meeting #86, S3-170254, Feb. 6-10, 2017.
Non-Final Office Action for U.S. Appl. No. 16/484,070, dated Sep. 25, 2020, 11 pages.
Author Unknown, "Technical Specification Group Radio Access Network; Evolved Universal Terrestrial Radio Access (E-UTRA); Physical channels and modulation (Release 12)," Technical Specification 36.211, Version 12.3.0, 3GPP Organizational Partners, Sep. 2014, 124 pages.
Author Unknown, "Technical Specification Group Radio Access Network; Evolved Universal Terrestrial Radio Access (E-UTRA); Multiplexing and channel coding (Release 12)," Technical Specification 36.212, Version 12.6.0, 3GPP Organizational Partners, Sep. 2015, 95 pages.
Author Unknown, "Technical Specification Group Radio Access Network; Evolved Universal Terrestrial Radio Access (E-UTRA); Physical layer procedures (Release 12)," Technical Specification 36.213, Version 12.3.0, 3GPP Organizational Partners, Sep. 2014, 212 pages.
Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.1.0, 3GPP Organizational Partners, Mar. 2014, 57 pages.
Ericsson, et al., "R1-163508: MCS Table for Initial Partial TTI in LAA," Third Generation Partnership Project (3GPP), TSG-RAN WG1 #84bis, Apr. 11-15, 2016, 4 pages, Busan, Korea.
Huawei, et al., "R1-1700420: Discussion on usage of mini-slot in unlicensed band below 6GHz," Third Generation Partnership Project (3GPP), TSG RAN WG1 NR AdHoc Meeting, Jan. 16-20, 2017, 5 pages, Spokane, USA.
Huawei, "R4-1701085: Discussion on eLAA demodulation test," Third Generation Partnership Project (3GPP), TSG-RAN WG4 Meeting #82, Feb. 13-17, 2017, 5 pages, Athens, Greece.
Intel Corporation, "R1-1704682: On the multiple uplink starting and ending positions for FS3," Third Generation Partnership Project (3GPP), TSG RAN WG1 Meeting #88bis, Apr. 3-7, 2017, 6 pages, Spokane, USA.
International Search Report and Written Opinion for International Patent Application No. PCT/IB2018/052949, dated Aug. 21, 2018, 17 pages.
Written Opinion for International Patent Application No. PCT/IB2018/052949, dated Mar. 25, 2019, 17 pages.
International Preliminary Report on Patentability for International Patent Application No. PCT/IB2018/052949, dated Jul. 10, 2019, 32 pages.
International Search Report and Written Opinion for International Patent Application No. PCT/IB2018/052005, dated Jun. 19, 2018, 14 pages.
International Search Report and Written Opinion for International Patent Application No. PCT/IB2018/052006, dated Jun. 22, 2018, 15 pages.
Notice of Allowance for U.S. Appl. No. 16/474,072, dated Jul. 1, 2021, 11 pages.
RAN1: "R2-1 700692: Response LS to IEEE 802.11 regarding LAA," 3GPP TSG RAN WG2#97, Feb. 13-17, 2017, Athens, Greece, 13 pages.
Examination Report for European Patent Application No. 18717997.3, dated Jun. 7, 2021, 11 pages.
Examination Report for European Patent Application No. 18717998.1, dated Jun. 28, 2021, 12 pages.

* cited by examiner

MULTIPLE STARTING POSITIONS FOR UPLINK TRANSMISSION ON UNLICENSED SPECTRUM

RELATED APPLICATIONS

This application is a 35 U.S.C. § 371 national phase filing of International Application No. PCT/IB2018/052949, filed Apr. 27, 2018, which claims the benefit of provisional patent application Ser. No. 62/491,399, filed Apr. 28, 2017, the disclosures of which are hereby incorporated herein by reference in their entireties.

This application is related to International Publication Numbers WO 2018/173004 and WO 2018/173005.

TECHNICAL FIELD

The disclosed subject matter relates generally to telecommunications. Certain embodiments relate more particularly to concepts such as Licensed-assisted access, Long Term Evolution (LTE) uplink transmissions and Contention Window (CW) adjustment.

BACKGROUND

The 3GPP work on "Licensed-Assisted Access" (LAA) intends to allow Long Term Evolution (LTE) equipment to also operate in the unlicensed radio spectrum. Candidate bands for LTE operation in the unlicensed spectrum include 5 gigahertz (GHz), 3.5 GHz, etc. The unlicensed spectrum is used as a complement to the licensed spectrum or allows completely standalone operation.

For the case of an unlicensed spectrum used as a complement to the licensed spectrum, devices connect in the licensed spectrum (primary cell or PCell) and use carrier aggregation to benefit from additional transmission capacity in the unlicensed spectrum (secondary cell or SCell). The carrier aggregation (CA) framework allows to aggregate two or more carriers with the condition that at least one carrier (or frequency channel) is in the licensed spectrum and at least one carrier is in the unlicensed spectrum. In the standalone (or completely unlicensed spectrum) mode of operation, one or more carriers are selected solely in the unlicensed spectrum.

Regulatory requirements, however, may not permit transmissions in the unlicensed spectrum without prior channel sensing, transmission power limitations, or imposed maximum channel occupancy time. Since the unlicensed spectrum is generally shared with other radios of similar or dissimilar wireless technologies, a so called listen-before-talk (LBT) method needs to be applied. LBT involves sensing the medium for a pre-defined minimum amount of time and backing off if the channel is busy. Due to the centralized coordination and dependency of terminal devices on the base-station (eNB) for channel access in LTE operation and imposed LBT regulations, LTE uplink (UL) performance is especially hampered. UL transmission is becoming more and more important with user-centric applications and the need for pushing data to cloud.

Today, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum. Unlike the case in LTE, Wi-Fi terminals can asynchronously access the medium and thus show better UL performance characteristics especially in congested network conditions.

LTE uses Orthogonal Frequency Division Multiplexing (OFDM) in the downlink and Discrete Fourier Transform (DFT)-spread OFDM (also referred to as single-carrier Frequency Division Multiple Access (FDMA)) in the uplink. The basic LTE downlink physical resource can thus be seen as a time-frequency grid as illustrated in FIG. 1 where each resource element corresponds to one OFDM subcarrier during one OFDM symbol interval. The uplink subframe has the same subcarrier spacing as the downlink and the same number of Single Carrier FDMA (SC-FDMA) symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe, and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3. The reference symbols shown in FIG. 3 are the cell specific reference symbols (CRS) and are used to support multiple functions including fine time and frequency synchronization and channel estimation for certain transmission modes.

Uplink transmissions are dynamically scheduled, i.e., in each downlink subframe the base station transmits control information about which terminals should transmit data to the eNB in subsequent subframes, and upon which resource blocks the data is transmitted. The uplink resource grid is comprised of data and uplink control information in the Physical Uplink Shared Channel (PUSCH), uplink control information in the Physical Uplink Control Channel (PUCCH), and various reference signals such as Demodulation Reference Signals (DMRS) and Sounding Reference Signals (SRS). DMRSs are used for coherent demodulation of PUSCH and PUCCH data, whereas SRSs are not associated with any data or control information but are generally used to estimate the uplink channel quality for purposes of frequency-selective scheduling. An example uplink subframe is shown in FIG. 4. Note that UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are UE specific and are indicated by scrambling the Downlink Control Information (DCI) Cyclic Redundancy Check (CRC) with the User Equipment (UE)-specific Cell Radio Network Temporary Identifier (C-RNTI). A unique C-RNTI is assigned by a cell to every UE associated with it, and can take values in the range 0001-FFF3 in hexadecimal format. A UE uses the same C-RNTI on all serving cells.

In LTE the uplink access is typically controlled by eNB, i.e., scheduled. In this case the UE would report to the eNB when data is available to be transmitted, e.g., by sending a scheduling request message (SR). Based on this, the eNB would grant the resources and relevant information to the UE in order to carry out the transmission of a certain size of data. The assigned resources are not necessarily sufficient for the UE to transmit all the available data. Therefore, it is possible that the UE sends a buffer status report (BSR) control message in the granted resources, in order to inform the eNB about the correct size and updated size of the data waiting for transmission. Based on that, the eNB would further grant the resources to carry on with the UE uplink transmission of the corrected size of data.

In more detail, every time new data arrives at the UE's empty buffer, the following procedure should be performed:
a. Using Physical Uplink Control Channel (PUCCH), the UE informs the network that it needs to transmit data by sending a Scheduling Request (SR) indicating that it needs uplink access. UE has aperiodic timeslots for SR transmissions (typically on a 5, 10, or 20 ms interval).
b. Once the eNB receives the SR request bit, it responds with a small "uplink grant" that is just large enough to communicate the size of the pending buffer. The reaction to this request typically takes 3 ms.
c. After the UE receives and processes (takes about 3 ms) its first uplink grant, it typically sends a Buffer Status Report (BSR) that is a Medium Access Control (MAC) Control Element (MAC CE) used to provide information about the amount of pending data in the uplink buffer of the UE. If the grant is big enough, the UE sends data from its buffer within this transmission as well. Whether the BSR is sent depends also on conditions specified in 3GPP TS 36.321.
d. The eNB receives the BSR message, allocates the necessary uplink resources and sends back another uplink grant that will allow the device to drain its buffer.

Adding it all up, about 16 ms (+time to wait for PUCCH transmission opportunity) of delay can be expected between data arrival at the empty buffer in the UE and reception of this data in the eNB.

In case the UE is not Radio Resource Control (RRC) connected in LTE or lost its uplink synchronization since it did not transmit or receive anything for a certain time, the UE would use the random access procedure to connect to the network, obtain synchronization and also send the SR. If this is the case, the procedure until the data can be sent would take even longer than the SR transmission on PUCCH.

In the LTE system, the transmission formats and parameters are controlled by the eNB. Such downlink control information (DCI) typically contains:
Resources allocated for UL transmission (including whether frequency hopping is applied).
Modulation and coding scheme
Redundancy versions
New data indicator
Transmit power control command
Information about demodulation reference symbol (DMRS)
In case of cross-carrier scheduling, the target carrier index is also included.
Other applicable control information on UL transmissions The DCI is first protected by 16-bit CRC. The CRC bits are further scrambled by the UE assigned identity (C-RNTI). The DCI and scrambled CRC bits are further protected by convolutional coding. The encoded bits are transmitted from the eNB to UE using either PDCCH or EPDCCH.

If the UE transmits transmissions using a Type 1 channel access procedure that are associated with channel access priority class p on a carrier, the UE maintains the contention window value $CW_p$ and adjusts $CW_p$ for those transmissions, using the following procedure:
If the New Data Indicator (NDI) value for at least one Hybrid Automatic Repeat Request (HARQ) process associated with HARQ_ID_ref is toggled,
For every priority class $p \in \{1, 2, 3, 4\}$ set $CW_p = CW_{min,p}$
Otherwise, increase $CW_p$ for every priority class $p \in \{1, 2, 3, 4\}$ to the next higher allowed value;
HARQ_ID_ref is the HARQ process ID of UL-SCH in reference subframe $n_{ref}$. The reference subframe $n_{ref}$ is determined as follows:
If the UE receives an UL grant in subframe $n_g$, subframe $n_w$ is the most recent subframe before subframe $n_g-3$ in which the UE has transmitted UL-SCH using Type 1 channel access procedure.
If the UE transmits transmissions including UL-SCH without gaps starting with subframe $n_0$ and in subframes $n_0, n_1, \Lambda, n_w$, reference subframe $n_{ref}$ is subframe $n_0$,
Otherwise, reference subframe $n_{ref}$ is subframe $n_w$, Up to now, the spectrum used by LTE is dedicated to LTE. This has the advantage that LTE system does not need to care about the coexistence issue and the spectrum efficiency can be maximized. However, the spectrum allocated to LTE is limited which cannot meet the ever increasing demand for larger throughput from applications/services. Therefore, Rel-13 Licensed-assisted access (LAA) extended LTE to exploit unlicensed spectrum is required in addition to licensed spectrum. Unlicensed spectrum can, by definition, be simultaneously used by multiple different technologies. Therefore, LTE needs to consider the coexistence issue with other systems such as IEEE 802.11 (Wi-Fi). Operating LTE in the same manner in unlicensed spectrum as in licensed spectrum can seriously degrade the performance of Wi-Fi, as Wi-Fi will not transmit once it detects the channel is occupied.

Furthermore, one way to utilize the unlicensed spectrum reliably is to transmit essential control signals and channels on a licensed carrier. That is, as shown in FIG. 5, a UE is connected to a PCell in the licensed band and one or more SCells in the unlicensed band. In this application we denote a secondary cell in unlicensed spectrum as licensed-assisted access secondary cell (LAA SCell). In the case of standalone operation as in MulteFire, no licensed cell is available for uplink control signal transmissions.

SUMMARY

Systems and method for multiple uplink starting positions are disclosed. In some embodiments, a method of operating a wireless communication device includes identifying candidate starting positions for an uplink (UL) transmission in an unlicensed spectrum and selecting at least one starting position from among the candidate start positions based on autonomous UL starting points according to an outcome of a listen-before-talk (LBT) procedure performed with respect to the unlicensed spectrum and/or one or more fixed UL starting points signaled in an UL grant. In this way, a wireless communication device may improve throughput by using resources that would not have been available otherwise.

In some embodiments, selecting the at least one starting position is based on autonomous UL starting points, and the method also includes, if a channel is obtained at a subframe boundary, transmitting a whole transport block (TB) on a full subframe.

In some embodiments, selecting the at least one starting position is based on autonomous UL starting points, and the method also includes, if a channel is not obtained at a subframe boundary, puncturing a TB and transmitting a partial subframe depending on LBT outcome.

In some embodiments, the method also includes retransmitting the discarded part of the TB in the last scheduled uplink subframe using the same HARQ process ID as the punctured subframe. In some embodiments, the method also includes retransmitting a whole TB in the last scheduled uplink subframe using the same HARQ process ID as the punctured subframe.

In some embodiments, the method also includes retransmitting autonomously the discarded part of the TB in the next subframe after the scheduled uplink subframes. In some embodiments, the method also includes retransmitting autonomously the whole TB in the next subframe after scheduled uplink subframes.

In some embodiments, the method also includes obtaining an UL grant from an eNB; and determining if the wireless communication device is allowed to autonomously transmit after scheduled uplink subframe based on the UL grant from the eNB.

In some embodiments, where the wireless communication device is allowed to autonomously transmit after scheduled uplink subframe, the method also includes transmitting the discarded part of the TB, if the wireless communication device does not transmit a full first subframe. In some embodiments, where the wireless communication device is not allowed to autonomously transmit after scheduled uplink subframe, the method also includes waiting for a full or partial subframe retransmission schedule.

In some embodiments, the method also includes obtaining a scheduling decision of X subframes followed by a predetermined partial or full subframe. In some embodiments, the scheduling of a partial UL subframe is received by the wireless communication device in a grant indicating that the wireless communication device shall stop UL transmission in the partial UL subframe at a UL ending point earlier than the last symbol.

In some embodiments, where the wireless communication device does not transmit full first subframe, the method also includes puncturing the TB for first subframe; and retransmitting the discarded part of TB or the full TB on the predetermined subframe scheduled at the end of transmission burst using same HARQ process ID as the punctured subframe.

In some embodiments, where the wireless communication device transmits a full first subframe, the method also includes transmitting with a different HARQ process ID in the predetermined subframe as compared to the full first subframe.

In some embodiments, where the wireless communication device transmits on full first subframe, the method also includes refraining from transmitting on the predetermined partial or full subframe.

In some embodiments, the method also includes scaling down the Transport Block Size (TBS) of a first subframe if it is a partial subframe transmission. In some embodiments, scaling down the TBS of the first subframe comprises determining the TBS of the first subframe based on $\lfloor N_{PRB}*\alpha \rfloor$, where $\alpha$ is the ratio of transmitted partial subframe to a full subframe and $\lfloor x \rfloor$ is the floor function. In some embodiments, =1/2.

In some embodiments, the method also includes considering the subframe after the punctured transmission in a transmission burst as a reference subframe for contention window adjustment for LBT.

In some embodiments, the starting position is based on a fixed UL starting point, and the method also includes following an UL grant for communication. In some embodiments, the method also includes scaling down the TBS for a first subframe in the uplink transmission burst and for multi-subframe scheduling. In some embodiments, scaling down the TBS of the first subframe comprises determining the TBS of the first subframe based on $\lfloor N_{PRB}*\alpha \rfloor$, where $\alpha$ is the ratio of transmitted partial subframe to a full subframe and $\lfloor x \rfloor$ is the floor function. In some embodiments, $\alpha=1/2$.

In some embodiments, the method also includes receiving two TBS/MCS signaled in the UL grant, one used for a partial subframe transmission and another for full subframe transmissions within the scheduled subframes.

In some embodiments, the method includes scaling down the TBS of a first subframe in an uplink transmission burst for a single subframe scheduling.

In certain embodiments of the disclosed subject matter, detailed design and UE behavior are provided for supporting multiple starting positions for UL transmission on unlicensed spectrum considering autonomous UL starting points based on LBT, and fixed UL starting points signaled in UL grant.

In a first option, the UE punctures the Transport Block (TB) to transmit partial subframe depending on LBT outcome. The UE can discard the remaining part of the TB or retransmit the discarded part of the TB in later subframes. In a second option the UE simply follows UL grant for transmission. But it scales down the TB size (TBS) for the first subframe of a transmission burst if UE cannot transmit full subframe due to LBT failure at subframe boundary.

Certain embodiments can be applied to LAA/NR-U/MulteFire or other technologies operating UL transmission on unlicensed spectrum.

Certain embodiments are presented in recognition of shortcomings associated with conventional techniques and technologies, such as the following examples. Approaches have been considered to support multiple starting positions for UL transmission on unlicensed spectrum, such as autonomous UL starting points based on LBT, and fixed UL starting points signaled in UL grant. Unfortunately, the detailed design and UE behavior are not set for these approaches.

Certain embodiments may provide potential benefits compared to conventional techniques and technologies, such as the following examples.

Support of multiple starting positions for flexible and efficient channel access on unlicensed spectrum
  Reduce UL transmission delay and increase the overall system performance Enable efficient UL scheduling and transmission when multiple starting/ending positions is supported.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Thus the disclosed subject matter provides, among other things, methods to support multiple starting positions for scheduled UL transmission on unlicensed spectrum for both autonomous and fixed UL starting points.

The description below assumes LAA operation as an example. However, the methods disclosed herein can also be applied to LAA/NR-U/MulteFire or other technologies operating scheduled UL transmission on unlicensed spectrum.

In one embodiment, multiple starting positions can be configured via RRC signaling for a UE. The UE starts UL transmission at one of the multiple starting positions depending on when it gets the channel.

Note that while the term "subframe" is used for LAA/LTE, in 5G, the term "slot" may be used. Thus, while the discussion below focuses on LAA and therefore uses the terms "subframe," it is to be understood that the same concepts apply to 5G in Unlicensed Spectrum (5G-U) but where the term "slot" is used in place of "subframe." Thus, the term "subframe/slot" is used to generally refer to either a subframe or a slot.

Figure 6:
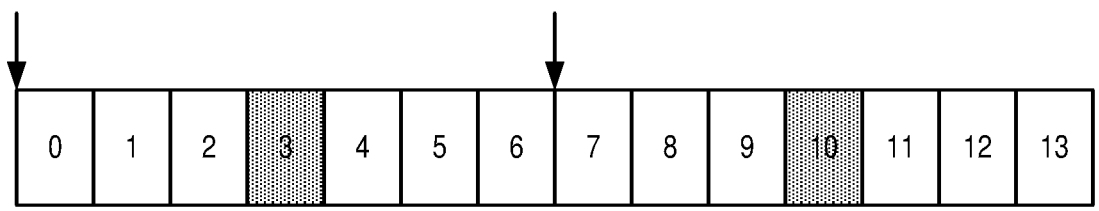
FIG. 6 illustrates multiple starting positions for UL, according to some embodiments of the current disclosure.

In a first embodiment, if the UE gets the channel at subframe boundary, it transmits the whole TB on a full subframe; if the UE gets the channel at one of the other starting points, it punctures the TB and only transmits part of the TB based on the available resources. For example, in FIG. 6 where two starting points defined, if UE gets the channel at symbol #7, it punctures the TB to only transmit the second half of the TB starting from symbol #7.

Figure 7:
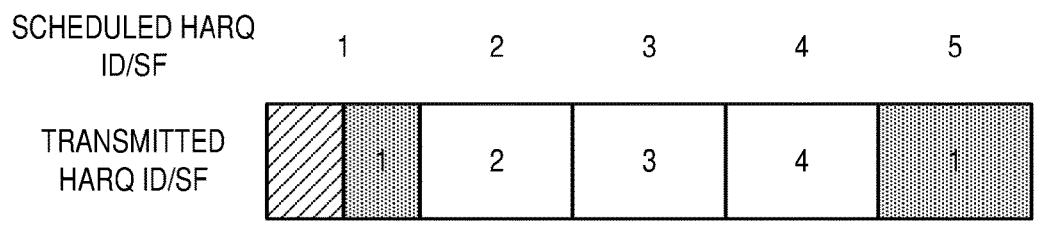
FIG. 7 illustrates a retransmission of punctured transmission within same UL burst, according to some embodiments of the current disclosure.

As an alternative, if the UE punctures the TB and transmits part of the TB in the first transmission and discards the remaining part, it shall retransmit the discarded part of the TB or the whole TB in the last scheduled UL subframe. The last subframe in the scheduled UL burst, follows the same HARQ ID as the punctured subframe, FIG. 7 shows an example. eNB receives two transmissions for the same TB and combines them for decoding.

Figure 8:
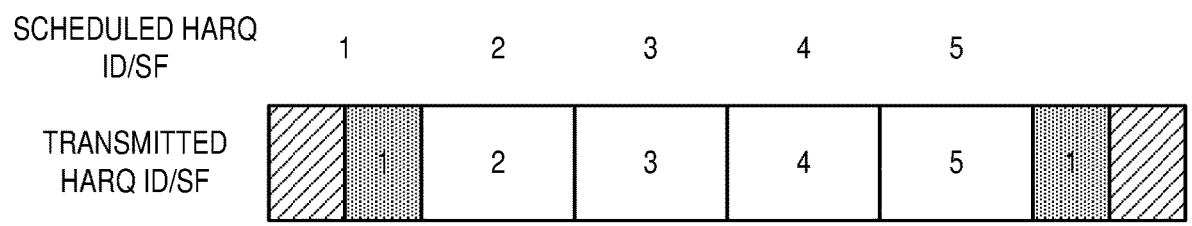
FIG. 8 illustrates a retransmission of punctured transmission after the scheduled UL burst, according to some embodiments of the current disclosure.

In a second embodiment, if the UE punctures the TB and transmits part of the TB in the first transmission and discards the remaining part, it shall autonomously retransmit the discarded part of the TB or the whole TB after the scheduled UL subframes. This is shown in FIG. 8. The eNB receives two transmissions for the same TB and combines them for decoding.

In a third embodiment, one bit in the UL grant indicates whether the UE is allowed to autonomously transmit after the scheduled UL subframes. If the bit allows autonomous transmission at the end, the UE shall transmit the discarded part of the TB if the UE does not transmit full first subframe. If the bit disallows autonomous transmission at the end, a full retransmission will be scheduled by the eNB later.

In a fourth embodiment, the eNB schedules X full subframes and part of a subframe, e.g., 1/2 of the subframe for UL transmission. The scheduling of a partial UL subframe is via signaling to the UE in a grant DCI that the UE shall stop UL transmission in said partial UL subframe at a UL stopping point earlier than the last OFDM symbol.

Then if the UE does not transmit full first subframe and punctures the TB for first subframe, it shall autonomously transmit the discarded part of the TB on the partial subframe scheduled in the end of the transmission burst using the same HARQ process ID.

If the UE transmits full first subframe, it shall transmit new data with a new HARQ process ID in one embodiment. In a second embodiment, the UE shall not transmit on the partial subframe scheduled in the end if it transmits full first subframe.

In a fifth embodiment, the TBS of the first subframe in the UL transmission burst is always scaled down. For example, TBS is indexed by MCS and $\lfloor N_{PRB} * \alpha \rfloor$, where $\alpha$ is the ratio of transmitted partial subframe to a full subframe and $\lfloor x \rfloor$ is the floor function. The scaling factor may depend on the transmission starting point or may be semi-statically configured via higher layer signaling (such as radio resource control (RRC) signaling).

The UE uses the $I_{MCS}$ to read a $I_{TBS}$ indice from a table providing Modulation, TBS index and redundancy version table for PUSCH. It then uses the $I_{TBS}$ and the allocated PRB size $N_{PRB}$ to read the TBS from a table providing Transport block size (dimension 27×110).

A α factor is then applied to reduce the value of $N_{PRB}$ and then use the adjusted down index to read from the table providing Transport block size.

For LAA UL, $N_{PRB}$ is always a multiple of 10. In the present embodiment, α=1/2 is used. So the adjusted value will still be an integer. However, the TBS is determined with an adjusted value based on $\lfloor \alpha \cdot N_{PRB} \rfloor$, where $\lfloor x \rfloor$ is the floor function.

In a sixth embodiment, the punctured transmission on the first subframe in a transmission burst is not considered as a reference subframe for Contention Window (CW) adjustment for LBT.

In another embodiment, the reference subframe $n_{ref}$ is determined as follows:

If the UE receives an UL grant in subframe $n_g$, subframe $n_w$ is the most recent subframe before subframe $n_g$−3 in which the UE has transmitted UL-SCH using Type 1 channel access procedure.

If the UE transmits transmissions including UL-SCH without gaps starting with non-punctured subframe $n_0$ and in subframes $n_0, n_1, \Lambda, n_w$, reference subframe $n_{ref}$ is subframe $n_0$, If the UE transmits transmissions including UL-SCH without gaps starting with punctured subframe $n_0$ and in subframes $n_0, n_1, \Lambda, n_w$, reference subframe $n_{ref}$ is subframe $n_1$, otherwise, if $n_w$ is non-punctured, reference subframe $n_{ref}$ is subframe $n_w$, otherwise, $n_{ref}$ is kept the same as the last scheduled transmission.

Multiple starting positions can be configured via RRC signaling for a UE. The starting position for a scheduled UL subframe is signaled to the UE in UL grant.

In one embodiment, the TBS of the first subframe in the UL transmission burst is scaled down for multi-subframe scheduling. For example, TBS is indexed by MCS and $\lfloor N_{PRB}*\alpha \rfloor$ for the first subframe, where α is the ratio of partial subframe to a full subframe.

In another embodiment, one field is added to signal TBS/MCS for the first subframe in UL grant for multi-subframe scheduling.

In another embodiment, the TBS of the first subframe in the UL transmission burst is scaled down for single subframe scheduling.

Figure 1:
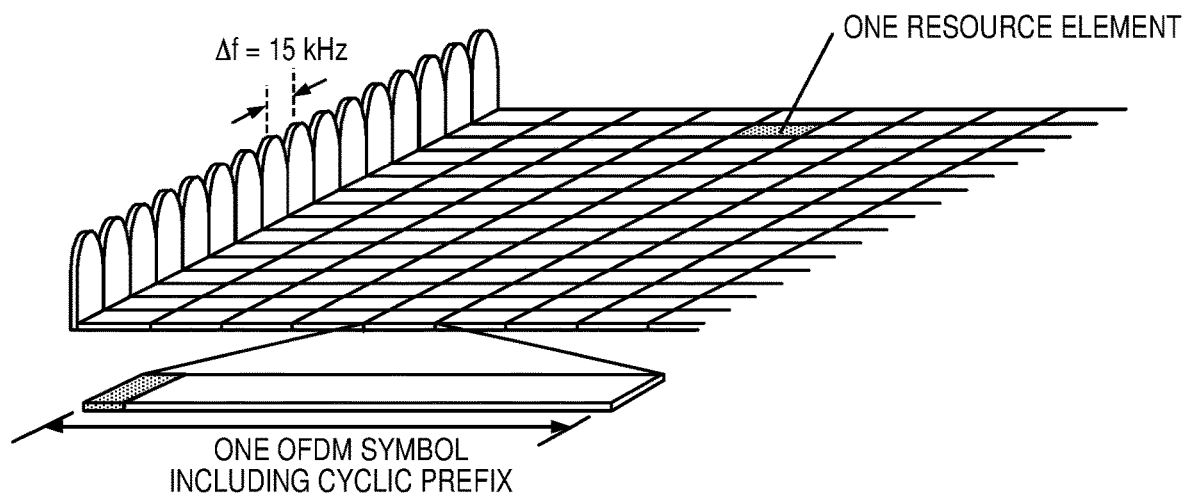
FIG. 1 illustrates an Long Term Evolution (LTE) downlink physical resource.

The described embodiments may be implemented in any appropriate type of communication system supporting any suitable communication standards and using any suitable components. As one example, certain embodiments may be implemented in a communication system such as that illustrated in FIG. 1. Although certain embodiments are described with respect to LTE systems and related terminology, the disclosed concepts are not limited to LTE or a 3GPP system. Additionally, although reference may be made to the term "cell", the described concepts may also apply in other contexts, such as beams used in Fifth Generation (5G) systems, for instance.

Figure 9:
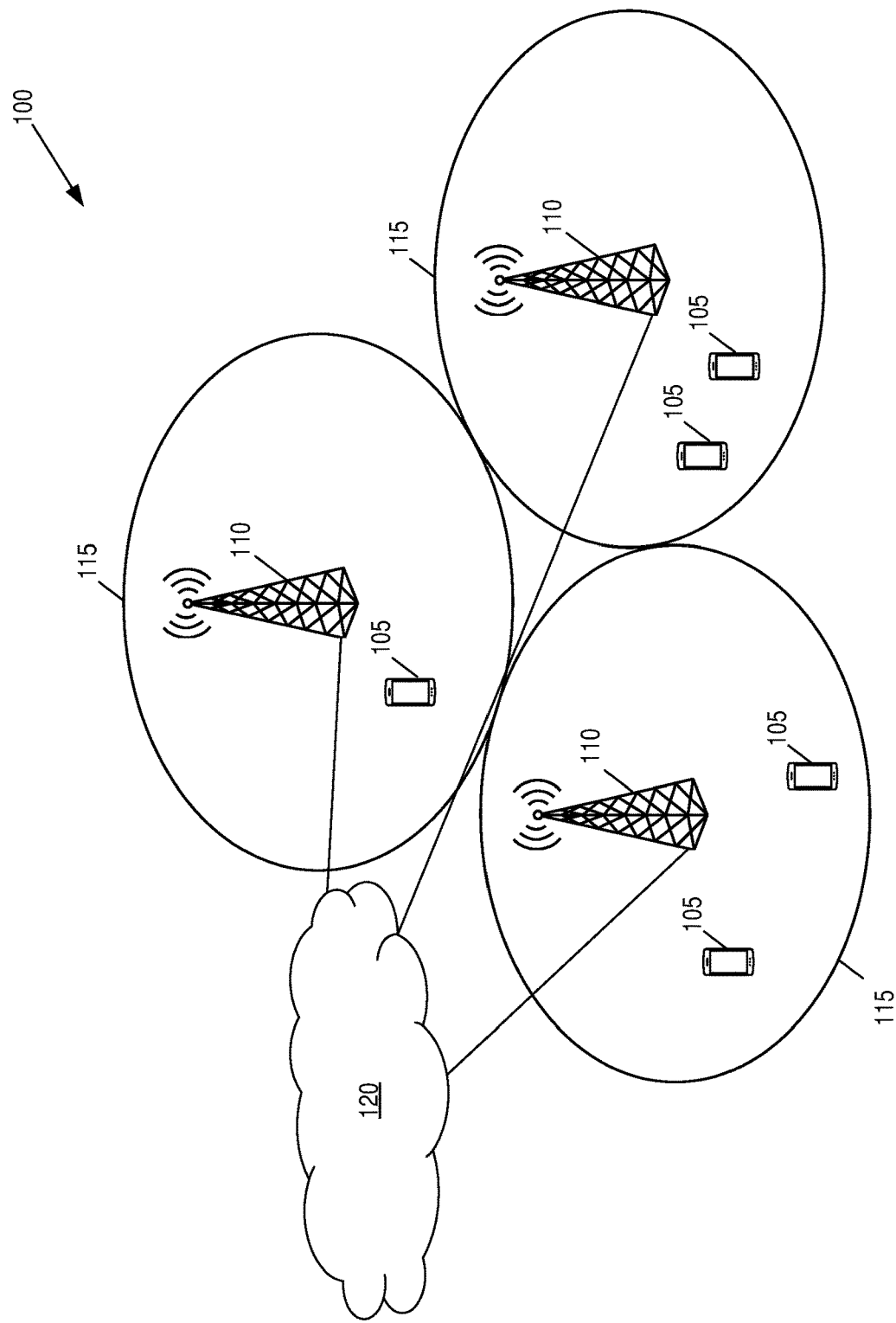
FIG. 9 illustrates a communication system according to an embodiment of the disclosed subject matter, according to some embodiments of the current disclosure.

Referring to FIG. 9, a communication system 100 comprises a plurality of wireless communication devices 105 (e.g., UEs, machine type communication [MTC]/machine-to-machine [M2M] UEs) and a plurality of radio access nodes 110 (e.g., eNodeBs or other base stations). Communication system 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone).

Figure 10A:
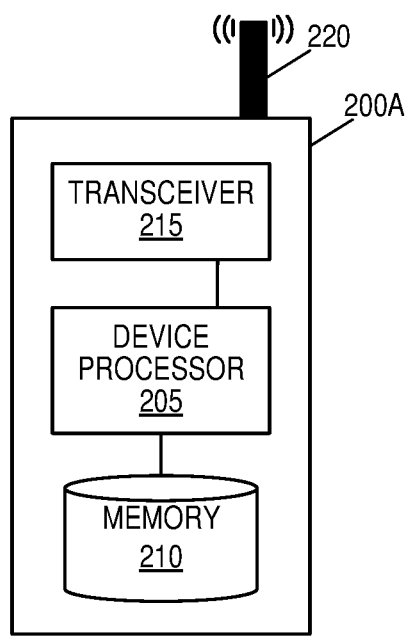
FIG. 10A illustrates a wireless communication device according to an embodiment of the disclosed subject matter, according to some embodiments of the current disclosure.
Figure 10B:
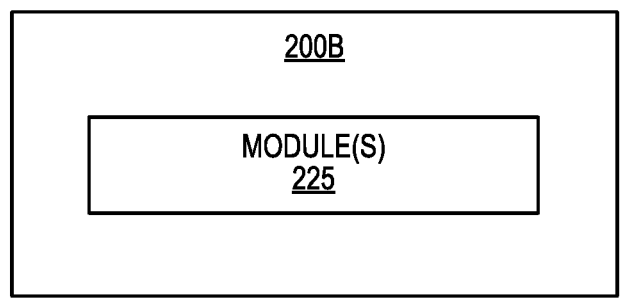
FIG. 10B illustrates a wireless communication device according to another embodiment of the disclosed subject matter, according to some embodiments of the current disclosure.

Although wireless communication devices 105 may represent communication devices that include any suitable combination of hardware and/or software, these wireless communication devices may, in certain embodiments, represent devices such as those illustrated in greater detail by FIGS. 10A and 10B. Similarly, although the illustrated radio access node may represent network nodes that include any suitable combination of hardware and/or software, these nodes may, in particular embodiments, represent devices such those illustrated in greater detail by FIGS. 10A, 10B and 11A and 11B.

Figure 2:
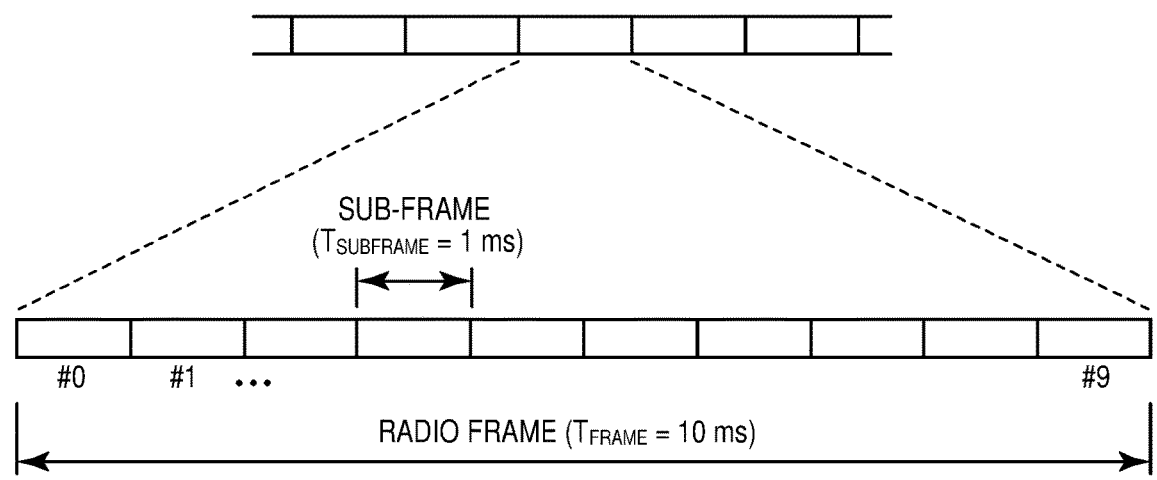
FIG. 2 illustrates an LTE time-domain structure.
Figure 3:
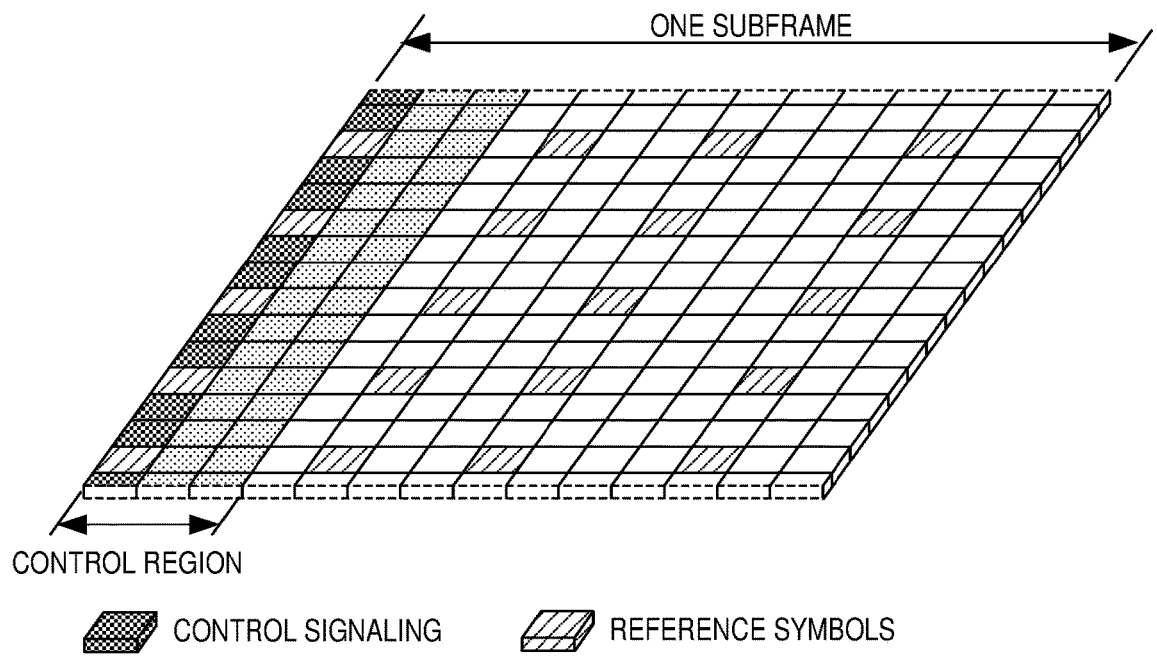
FIG. 3 illustrates a downlink subframe.
Figure 4:
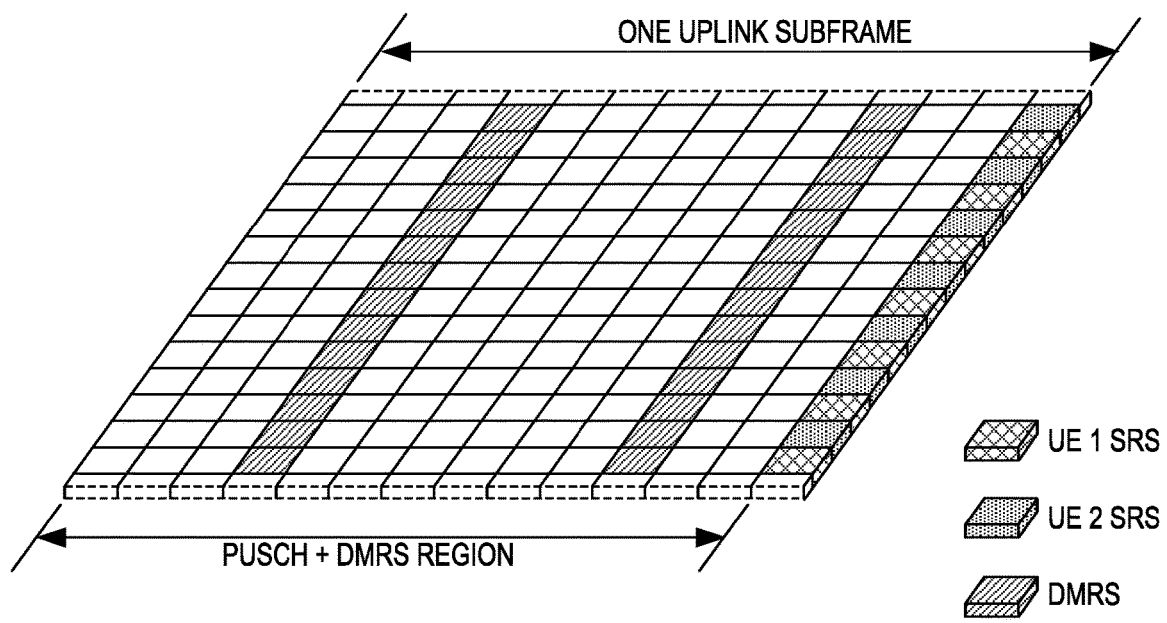
FIG. 4 illustrates an uplink subframe.
Figure 5:
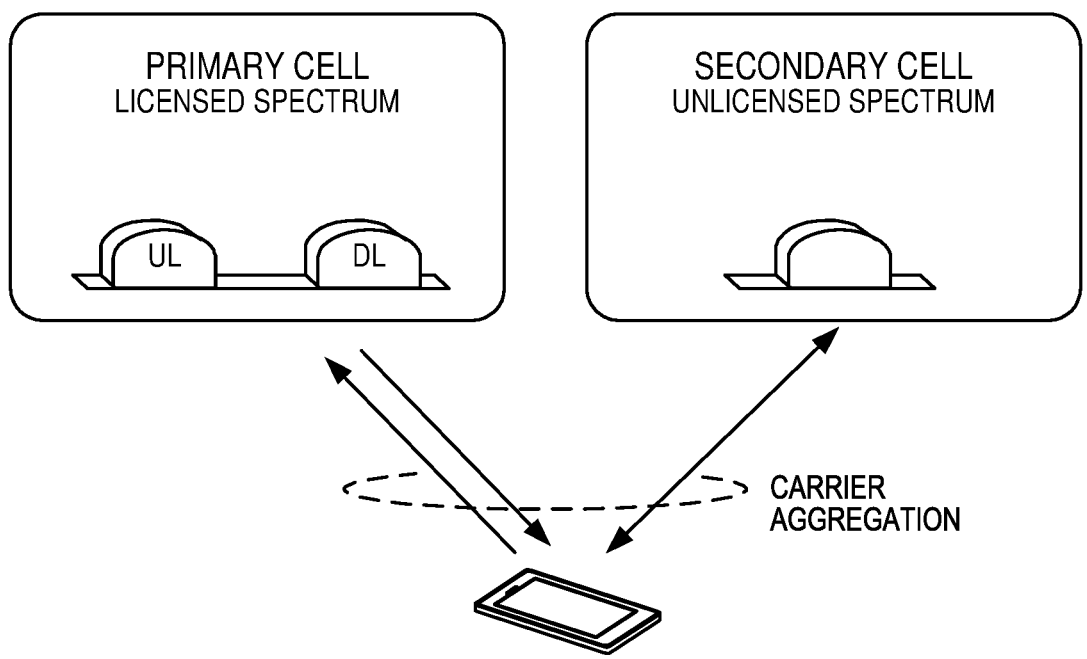
FIG. 5 illustrates licensed-assisted access (LAA) to unlicensed spectrum using LTE carrier aggregation.

Referring to FIG. 10A, a wireless communication device 200A comprises a processor 205 (e.g., Central Processing Units (CPUs), Application Specific Integrated Circuits (ASICs), Field Programmable Gate Arrays (FPGAs), and/or the like), a memory 210, a transceiver 215, and an antenna 220. In certain embodiments, some or all of the functionality described as being provided by UEs, MTC or M2M devices, and/or any other types of wireless communication devices may be provided by the device processor executing instructions stored on a computer-readable medium, such as memory 210. Alternative embodiments may include additional components beyond those shown in FIG. 2A that may be responsible for providing certain aspects of the device's functionality, including any of the functionality described herein.

Referring to FIG. 10B, a wireless communication device 200B comprises at least one module 225 configured to perform one or more corresponding functions. Examples of such functions include various method steps or combinations of method steps as described herein with reference to wireless communication device(s). In general, a module may comprise any suitable combination of software and/or hardware configured to perform the corresponding function. For instance, in some embodiments a module comprises software configured to perform a corresponding function when executed on an associated platform, such as that illustrated in FIG. 10A.

Figure 11A:
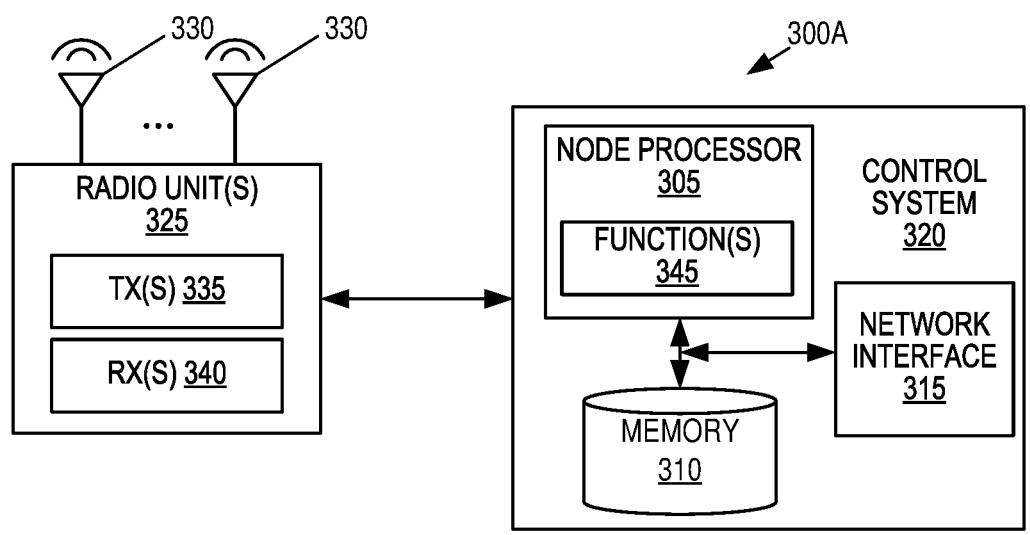
FIG. 11A illustrates a radio access node according to an embodiment of the disclosed subject matter, according to some embodiments of the current disclosure.

Referring to FIG. 11A, a radio access node 300A comprises a control system 320 that comprises a node processor 305 (e.g., CPUs, ASICs, FPGAs, and/or the like), memory 310, and a network interface 315. In addition, radio access node 300A comprises at least one radio unit 325 comprising at least one transmitter 335 and at least one receiver coupled to at least one antenna 330. In some embodiments, radio unit 325 is external to control system 320 and connected to control system 320 via, e.g., a wired connection (e.g., an optical cable). However, in some other embodiments, radio unit 325 and potentially the antenna 330 are integrated together with control system 320. Node processor 305 operates to provide at least one function 345 of radio access node 300A as described herein. In some embodiments, the function(s) are implemented in software that is stored, e.g., in the memory 310 and executed by node processor 305.

In certain embodiments, some, or all of the functionality described as being provided by a base station, a node B, an enodeB, and/or any other type of network node may be provided by node processor 305 executing instructions stored on a computer-readable medium, such as memory 310 shown in FIG. 11A. Alternative embodiments of radio access node 300 may comprise additional components to provide additional functionality, such as the functionality described herein and/or related supporting functionality.

Figure 11B:
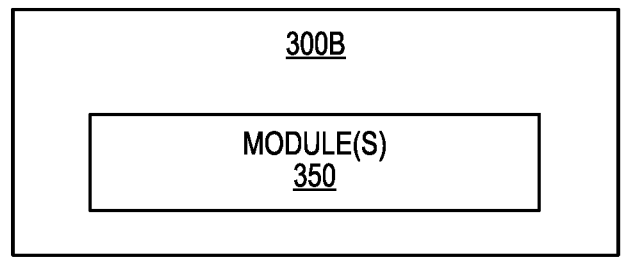
FIG. 11B illustrates a radio access node according to another embodiment of the disclosed subject matter, according to some embodiments of the current disclosure.

Referring to FIG. 11B, a radio access node 300B comprises at least one module 350 configured to perform one or more corresponding functions. Examples of such functions include various method steps or combinations of method steps as described herein with reference to radio access node(s). In general, a module may comprise any suitable combination of software and/or hardware configured to perform the corresponding function. For instance, in some embodiments a module comprises software configured to perform a corresponding function when executed on an associated platform, such as that illustrated in FIG. 11A.

Figure 12:
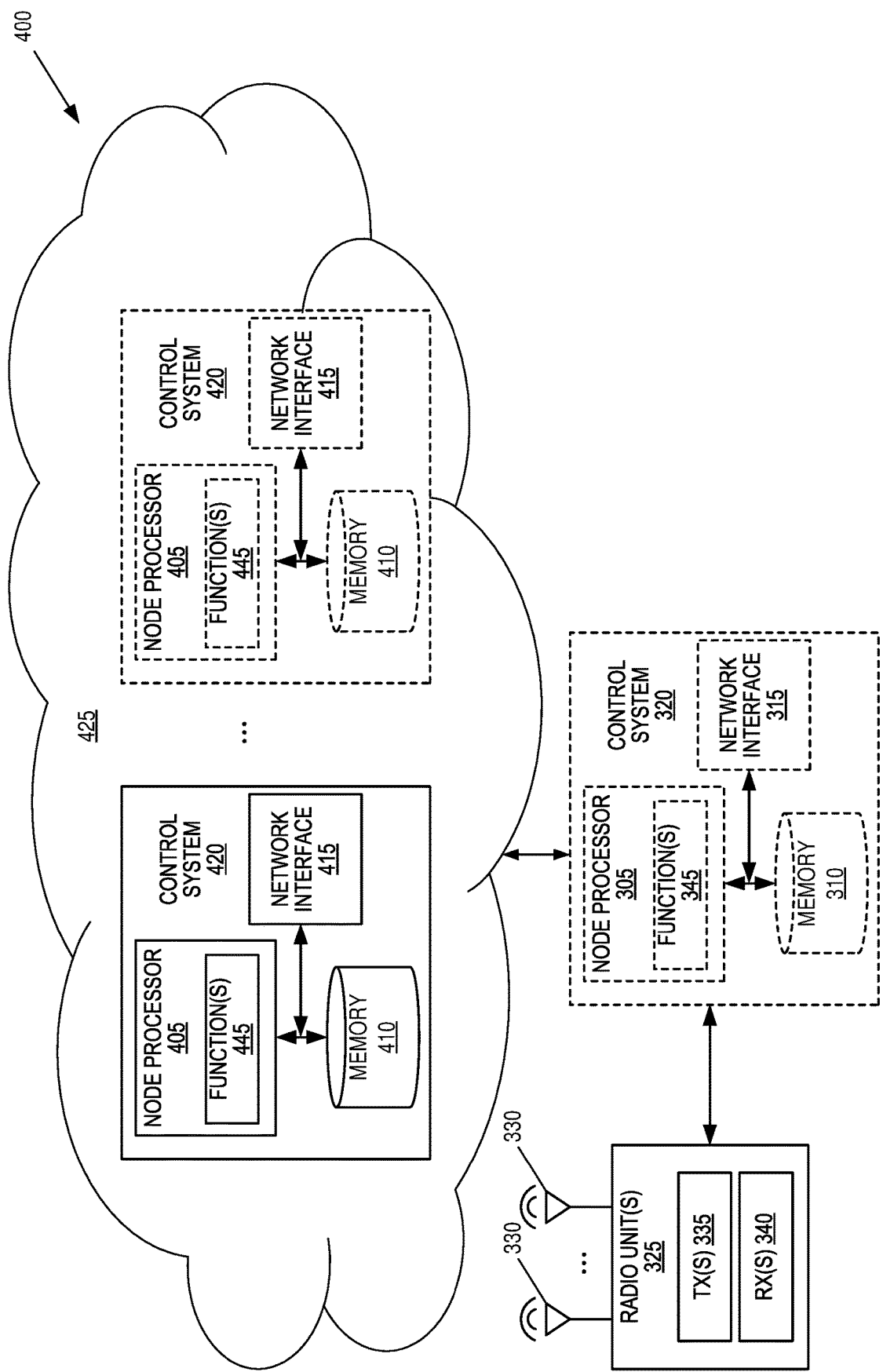
FIG. 12 illustrates a radio access node according to yet another embodiment of the disclosed subject matter, according to some embodiments of the current disclosure.

FIG. 12 is a block diagram that illustrates a virtualized radio access node 400 according to an embodiment of the disclosed subject matter. The concepts described in relation to FIG. 12 may be similarly applied to other types of network nodes. Further, other types of network nodes may have similar virtualized architectures. As used herein, the term "virtualized radio access node" refers to an implementation of a radio access node in which at least a portion of the functionality of the radio access node is implemented as a virtual component(s) (e.g., via a virtual machine(s) executing on a physical processing node(s) in a network(s)).

Referring to FIG. 12, radio access node 400 comprises control system 320 as described in relation to FIG. 11A.

Control system 320 is connected to one or more processing nodes 420 coupled to or included as part of a network(s) 425 via network interface 315. Each processing node 420 comprises one or more processors 405 (e.g., CPUs, ASICs, FPGAs, and/or the like), memory 410, and a network interface 415.

In this example, functions 345 of radio access node 300A described herein are implemented at the one or more processing nodes 420 or distributed across control system 320 and the one or more processing nodes 420 in any desired manner. In some embodiments, some or all of the functions 345 of radio access node 300A described herein are implemented as virtual components executed by one or more virtual machines implemented in a virtual environment(s) hosted by processing node(s) 420. As will be appreciated by one of ordinary skill in the art, additional signaling or communication between processing node(s) 420 and control system 320 is used in order to carry out at least some of the desired functions 345. As indicated by dotted lines, in some embodiments control system 320 may be omitted, in which case the radio unit(s) 325 communicate directly with the processing node(s) 420 via an appropriate network interface(s).

In some embodiments, a computer program comprises instructions which, when executed by at least one processor, causes at least one processor to carry out the functionality of a radio access node (e.g., radio access node 110 or 300A) or another node (e.g., processing node 420) implementing one or more of the functions of the radio access node in a virtual environment according to any of the embodiments described herein.

FIGS. 13A-F illustrate methods of operating a wireless communication device according to embodiments of the disclosed subject matter. The methods could be performed by an apparatus such as that illustrated in any of FIGS. 9-12, for instance. Additionally, the methods may be performed in conjunction with any of various alternative features as described above, such as various alternative time transmission interval configurations, subframe configurations, timing arrangements, signaling procedures, etc.

Figure 13A:
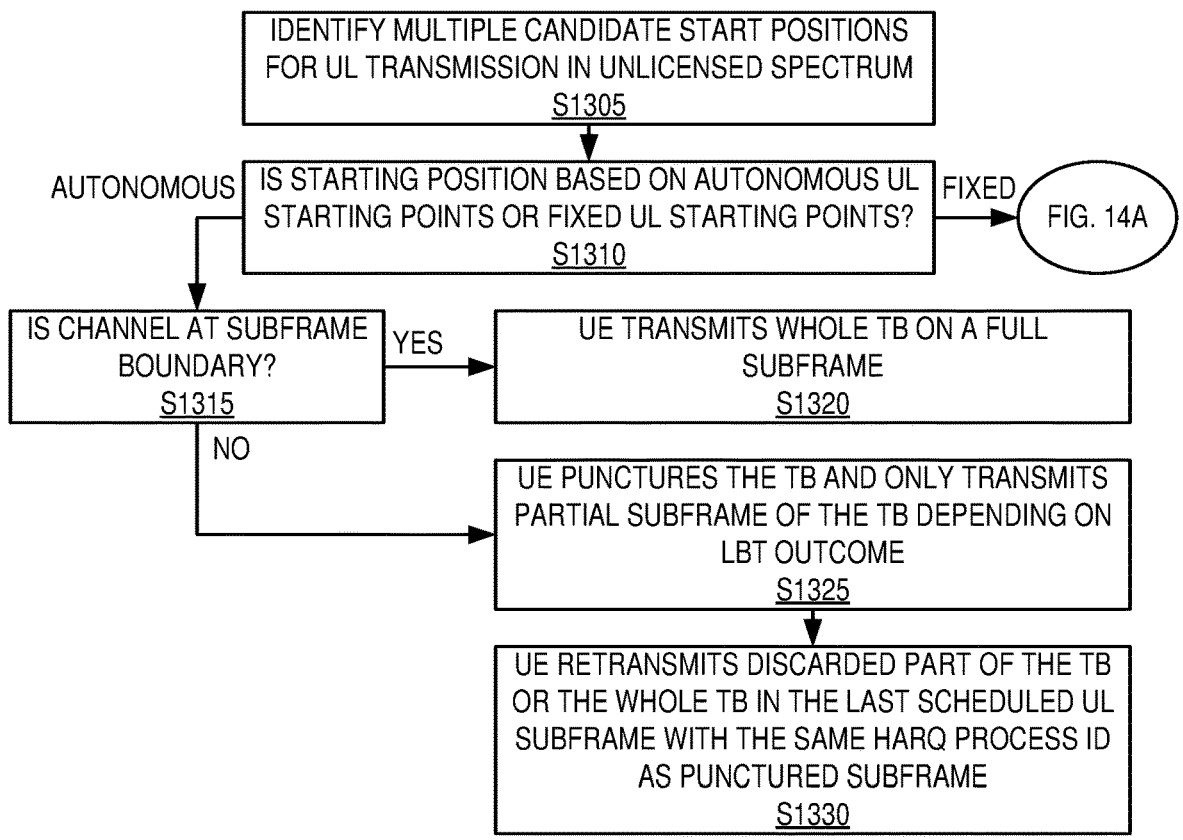
FIGS. 13A-F illustrate methods of operating a wireless communication device according to embodiments of the disclosed subject matter, according to some embodiments of the current disclosure.

Referring to FIG. 13A, the method comprises identifying multiple candidate start positions for uplink (UL) transmission in unlicensed spectrum (S1305), determining at step (S1310) if the starting positions will be based on autonomous UL starting points or fixed UL starting points. If autonomous UL starting points, determining at step (S1315) if the channel is at subframe boundary. If yes, the UE transmits the whole TB on a full subframe (S1320). If no, UE punctures the TB (S1325), and only transmits partial subframe of the TB depending on LBT outcome. At (S1330), the UE retransmits the discarded part of the TB in later subframes or the whole TB in the last scheduled UL subframe with the same HARQ process ID as the punctured subframe.

Figure 13B:
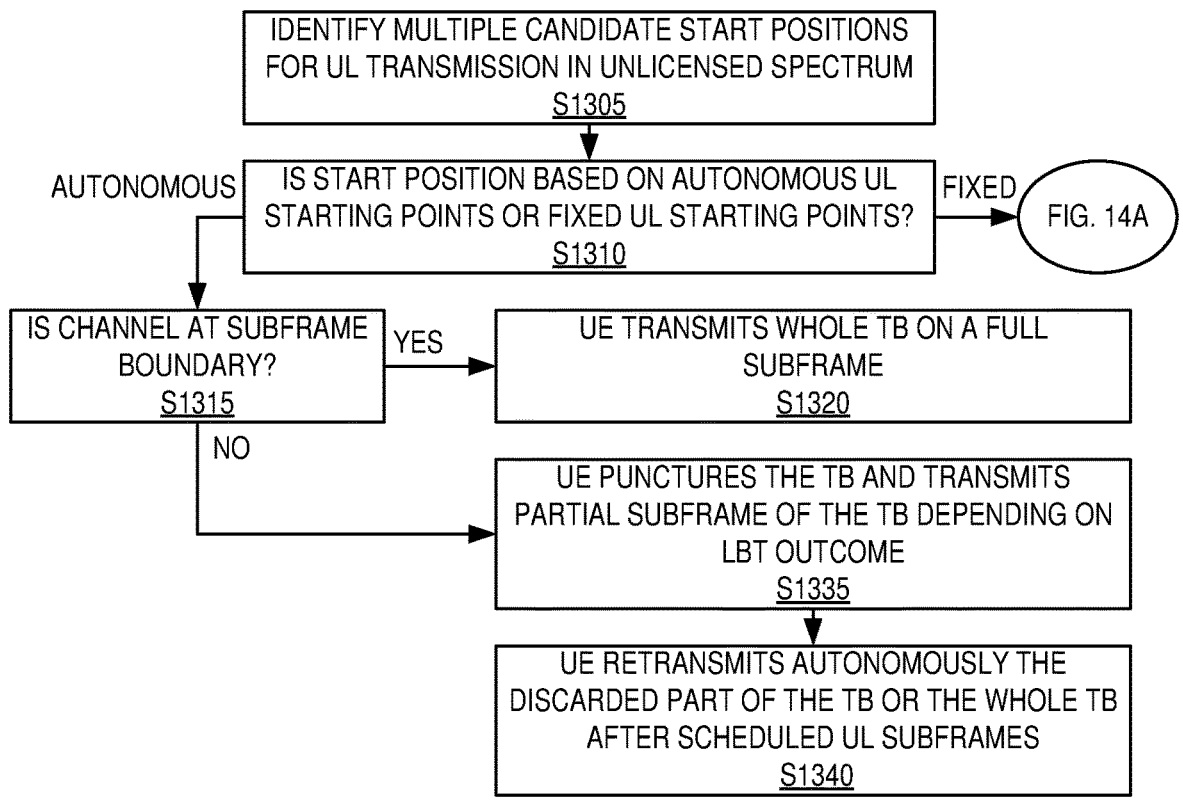

In FIG. 13B, as an alternative to the steps of FIG. 13A, if the UE punctures the TB and transmits partial subframe of the TB depending on LBT outcome (S1335), UE retransmit autonomously the discarded part of the TB or the whole TB after the scheduled UL subframes (S1340).

Figure 13C:
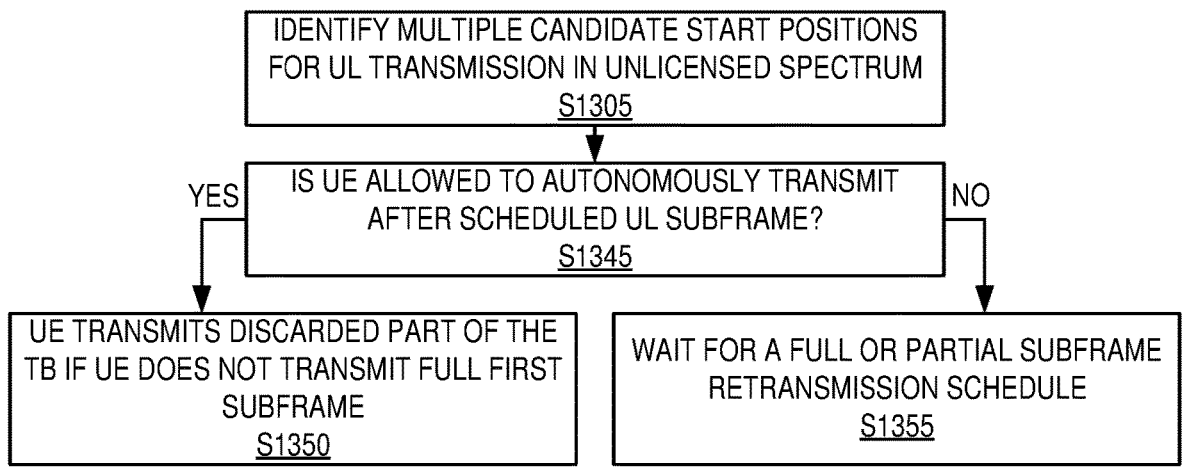

In FIG. 13C, one bit in the UL grant indicates whether the UE is allowed to autonomously transmit after the scheduled UL subframes (S1345). If the bit allows autonomous transmission at the end, the UE shall transmit the discarded part of the TB if the UE does not transmit full first subframe (S1350). If the bit disallows autonomous transmission at the end, UE waits for full or partial retransmission to be scheduled by the eNB later (S1355).

Figure 13D:
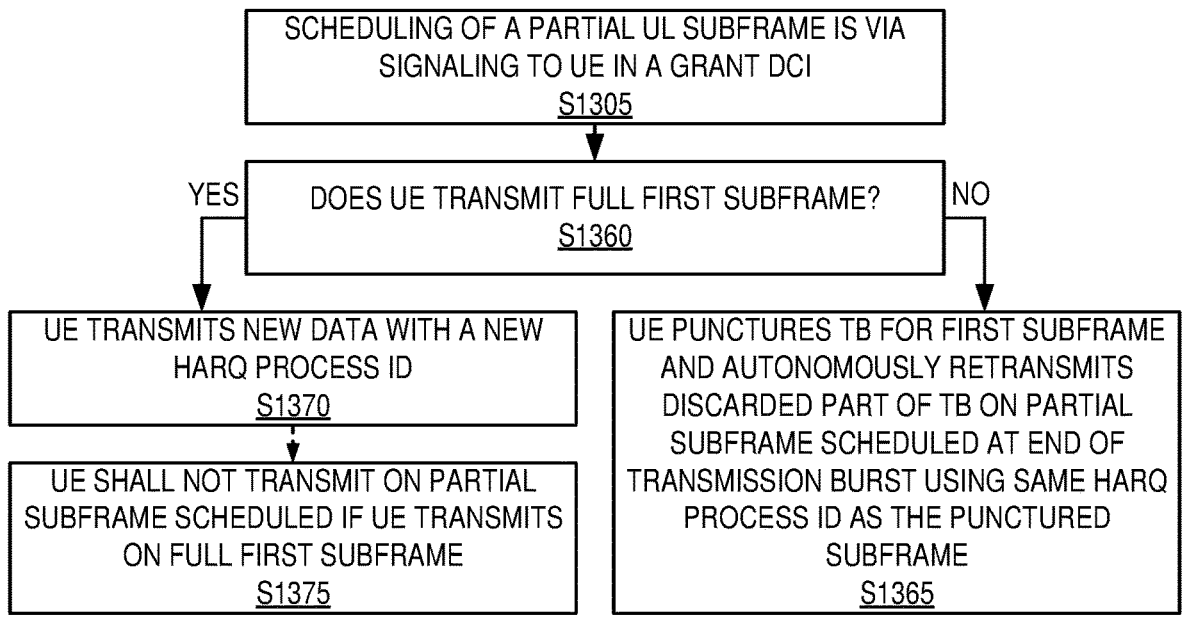

In FIG. 13D, we described above that the eNB schedules X full subframes and part of a subframe, e.g., 1/2 of the subframe for UL transmission. The scheduling of a partial UL subframe is via signaling to the UE in a grant DCI that the UE shall stop UL transmission in said partial UL subframe at a UL stopping point earlier than the last OFDM symbol.

Then, at step (S1360) determination is made if the UE transmit at full first subframe. If it does not (S1365), UE punctures the TB for first subframe, and autonomously retransmits the discarded part of the TB on the partial subframe scheduled at the end of the transmission burst using the same HARQ process ID as the punctured subframe.

If the UE transmits full first subframe (S1370), it transmits new data with a new HARQ process ID in one embodiment. As a further alternative (S1375), the UE shall not transmit on the partial subframe scheduled if it transmits full first subframe.

Figure 13E:
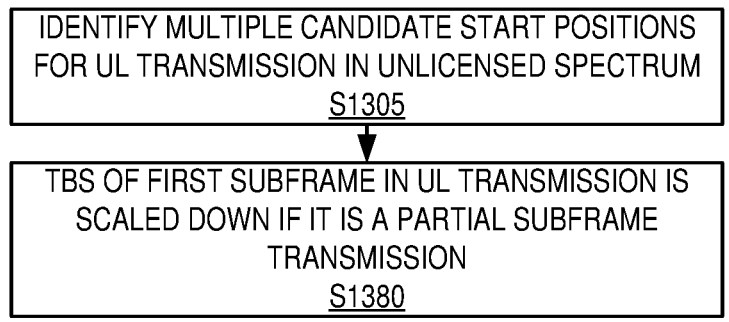

In FIG. 13E, the TBS of the first subframe in the UL transmission burst is scaled down if it is a partial subframe transmission (S1380). As indicated above, TBS is indexed by MCS and $\lfloor N_{PRB}*\alpha \rfloor$, where $\alpha$ is the ratio of transmitted partial subframe to a full subframe and $\lfloor x \rfloor$ is the floor function. The scaling factor may depend on the transmission starting point or may be semi-statically configured via higher layer signaling (such as radio resource control (RRC) signaling).

Figure 13F:
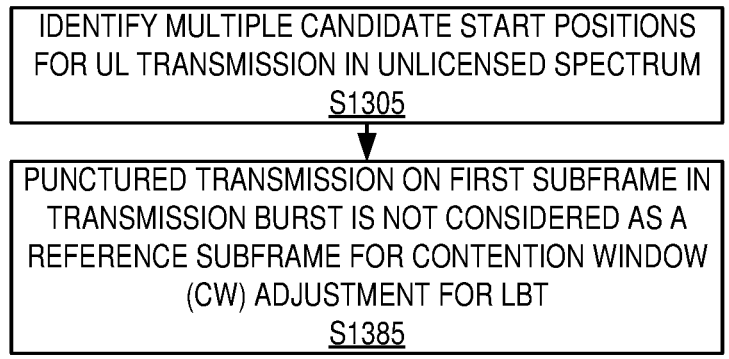

In FIG. 13F, the punctured transmission on the first subframe in a transmission burst is not considered as a reference subframe for Contention Window (CW) adjustment for LBT (S1385). In some embodiments, the subframe after the punctured transmission in a transmission burst is used as a reference subframe for CW adjustment, regardless of whether the punctured transmission is used.

Figure 14A:
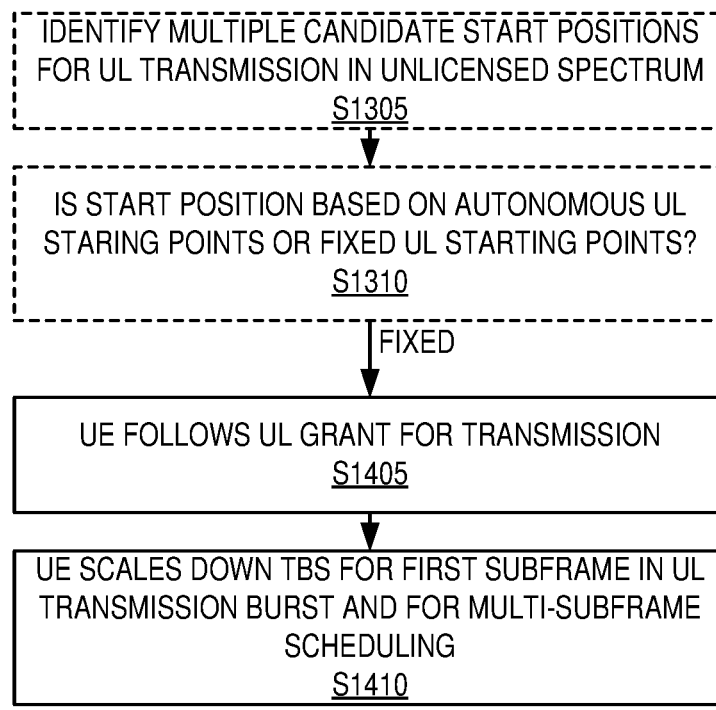
FIGS. 14A-C illustrates a method of operating a wireless communication device according to another embodiment of the disclosed subject matter, according to some embodiments of the current disclosure.

Referring to FIG. 14A, if at step (S1310) of FIG. 13A, the starting positions are based on fixed UL starting points, the UE simply follows the UL grant for transmission (S1405). But the UE scales down the TBS of the first subframe in the UL transmission burst and for multi-subframe scheduling (S1410).

Figure 14B:
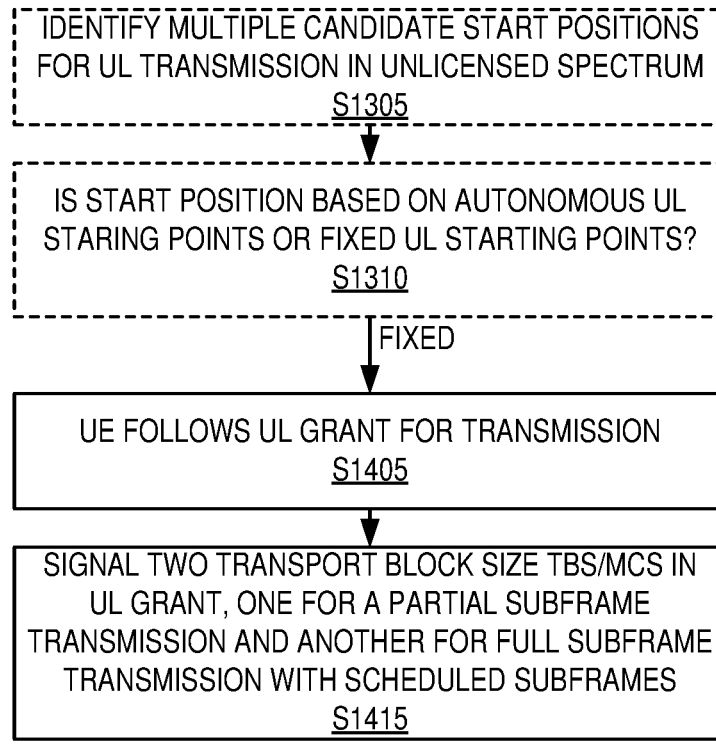

In FIG. 14B, two transport block size (TBS)/MCS are signaled in the UL grant, one used for a partial subframe transmission and another for full subframe transmissions within the scheduled subframes (S1415).

Figure 14C:
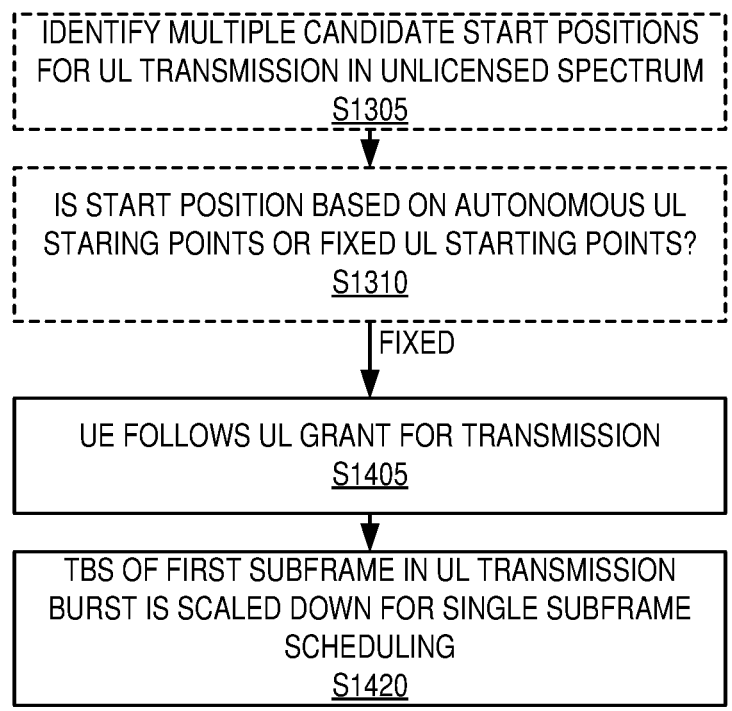

In FIG. 14C, the TBS of the first subframe in the UL transmission burst is scaled down for single subframe scheduling (S1420).

The selecting may be performed in any of various alternative ways as described above in relation to FIGS. 6-8, for instance. The performing of UL transmission may comprise e.g. transmitting information using defined resources as described above.

At least some of the following abbreviations may be used in this disclosure. If there is an inconsistency between abbreviations, preference should be given to how it is used above. If listed multiple times below, the first listing should be preferred over any subsequent listing(s).

BSR Buffer Status Request
CC Component Carrier
CCA Clear Channel Assessment
CQI Channel Quality Information
CRC Cyclic Redundancy Check
DCI Downlink Control Information
DL Downlink
DMTC DRS Measurement Timing Configuration
DRS Discovery Reference Signal
eNB evolved NodeB, base station
UE User Equipment
UL Uplink
LAA Licensed-Assisted Access
SCell Secondary Cell
STA Station
LBT Listen-before-talk
LTE-U LTE in Unlicensed Spectrum
PDCCH Physical Downlink Control Channel
PMI Precoding Matrix Indicator
PUSCH Physical Uplink Shared Channel
RAT Radio Access Technology
RNTI Radio Network Temporary Identifier
TB Transport Block
TBS Transport Block Size
TXOP Transmission Opportunity
UL Uplink
sTTI Shortened TTI

What is claimed is:

1. A method of operating a wireless communication device, comprising:
    identifying a plurality of candidate starting positions for an uplink, UL, transmission in an unlicensed spectrum;
    selecting at least one starting position from among the plurality of candidate starting positions based on autonomous UL starting points according to an outcome of a listen-before-talk, LBT, procedure performed with respect to the unlicensed spectrum; and
    determining whether a channel is obtained at a subframe/slot boundary;
    in response to determining that the channel is not obtained at the subframe/slot boundary, puncturing a whole transport block, TB, and transmitting a partial subframe/slot depending on the LBT outcome.

2. The method of claim 1, further comprising:
    in response to determining that the channel is obtained at the subframe/slot boundary, transmitting the whole TB on a full subframe/slot.

3. The method of claim 1, further comprising:
    retransmitting a discarded part of the TB in a last scheduled uplink subframe/slot using a same Hybrid Automatic Repeat Request, HARQ, process ID as a punctured subframe/slot.

4. The method of claim 1, further comprising:
    retransmitting the whole TB in a last scheduled uplink subframe/slot using a same Hybrid Automatic Repeat Request, HARQ, process ID as a punctured subframe/slot.

5. The method of claim 1, further comprising:
    retransmitting autonomously a discarded part of the TB in a next subframe/slot after scheduled uplink subframe/slots.

6. The method of claim 1, further comprising:
    retransmitting autonomously the whole TB in a next subframe/slot after scheduled uplink subframe/slots.

7. The method of claim 1, further comprising:
    obtaining a UL grant from a base station, eNB; and
    determining if the wireless communication device is allowed to autonomously transmit after the scheduled uplink subframe/slot based on the UL grant from the eNB.

8. The method of claim 7, wherein the wireless communication device is allowed to autonomously transmit after the scheduled uplink subframe/slot, the method further comprising:
    transmitting a discarded part of the TB, if the wireless communication device does not transmit a full first subframe/slot.

9. The method of claim 7, wherein the wireless communication device is not allowed to autonomously transmit after the scheduled uplink subframe/slot, the method further comprising:
    waiting for a full or partial subframe/slot retransmission schedule.

10. The method of claim 1, further comprising:
    obtaining a scheduling decision of X subframe/slots followed by a predetermined partial or full subframe/slot.

11. The method of claim 10, wherein the scheduling of a partial UL subframe/slot is received by the wireless communication device in a grant indicating that the wireless communication device shall stop UL transmission in the partial UL subframe/slot at a UL ending point earlier than the last symbol.

12. The method of claim 10, wherein the wireless communication device does not transmit a full first subframe/slot, the method further comprises:
    puncturing the TB for first subframe/slot; and
    retransmitting a discarded part of TB or the full TB on the predetermined subframe/slot scheduled at the end of transmission burst using same HARQ process ID as the punctured subframe/slot.

13. The method of claim 10, wherein the wireless communication device transmits a full first subframe/slot, the method further comprising:
    transmitting with a different Hybrid Automatic Repeat Request, HARQ, process ID in the predetermined subframe/slot instead of the full first subframe/slot.

14. The method of claim 10, wherein the wireless communication device transmits on a full first subframe/slot, the method further comprising:

refraining from transmitting on the predetermined partial subframe/slot.

15. The method of claim 1, further comprising:
scaling down a Transport Block Size, TBS, of a first subframe/slot if it is a partial subframe/slot transmission.

16. The method of claim 15 wherein scaling down the TBS of the first subframe/slot comprises determining the TBS of the first subframe/slot based on $\lfloor N_{PRB}*\alpha \rfloor$, where $\alpha$ is a ratio of a transmitted partial subframe/slot to a full subframe/slot and $\lfloor x \rfloor$ is a floor function.

17. The method of claim 1, further comprising:
considering a subframe/slot after a punctured transmission in a transmission burst as a reference subframe/slot for contention window adjustment for LBT.

18. A method of operating a wireless communication device, comprising:
identifying a plurality of candidate starting positions for an uplink, UL, transmission in an unlicensed spectrum;
selecting at least one starting position from among the plurality of candidate starting positions based on a fixed UL starting point;
following a UL grant for communication; and
scaling down a Transport Block Size, TBS, for a first subframe/slot in an uplink transmission burst and for multi-subframe/slot scheduling;
wherein scaling down the TBS of the first subframe/slot comprises determining the TBS of the first subframe/slot based on $\lfloor N_{PRB}*\alpha \rfloor$, where $\alpha$ is a ratio of a transmitted partial subframe/slot to a full subframe/slot and $\lfloor x \rfloor$ is a floor function.

19. The method of claim 18 wherein $\alpha=1/2$.

20. The method of claim 18, further comprising:
receiving two TBS/Modulation and Coding Schemes, MCS, signaled in the UL grant, one used for a partial subframe/slot transmission and another for full subframe/slot transmissions within scheduled subframes/slots.

21. The method of claim 18, further comprising:
scaling down the TBS of the first subframe/slot in the uplink transmission burst for a single subframe/slot scheduling.

22. A wireless communication device, comprising:
a processor; and
memory comprising instructions executable by the processor whereby the wireless communication device is operable to:
identify a plurality of candidate starting positions for an uplink, UL, transmission in an unlicensed spectrum; and
select at least one starting position from among the plurality of candidate start positions based on a fixed UL starting point;
follow a UL grant for communication; and
scale down a Transport Block Size, TBS, for a first subframe/slot in an uplink transmission burst and for multi-subframe/slot scheduling;
wherein scaling down the TBS of the first subframe/slot comprises determining the TBS of the first subframe/slot based on $\lfloor N_{PRB}*\alpha \rfloor$, where $\alpha$ is a ratio of a transmitted partial subframe/slot to a full subframe/slot and $\lfloor x \rfloor$ is a floor function.

* * * * *